United States Patent [19]

Thomas

[11] 4,404,303

[45] Sep. 13, 1983

[54] CARBONATE POLYMERS CONTAINING A BARBITUATE AS AN IGNITION DEPRESSANT

[75] Inventor: Lowell S. Thomas, Midland, Mich.

[73] Assignee: The Dow Chemical Company, Midland, Mich.

[21] Appl. No.: 361,318

[22] Filed: Mar. 24, 1982

[51] Int. Cl.$^3$ ............................................... C08K 5/34
[52] U.S. Cl. ..................................... 524/100; 524/101
[58] Field of Search ................................. 524/100, 101

[56] References Cited

U.S. PATENT DOCUMENTS

| | | | |
|---|---|---|---|
| 3,888,822 | 6/1975 | Gilleo et al. | 524/100 |
| 4,028,297 | 6/1977 | Webb | 524/418 |
| 4,031,073 | 6/1977 | Mory et al. | 106/308 Q |
| 4,098,754 | 7/1978 | Neuray et al. | 528/197 |
| 4,171,301 | 10/1979 | Mory | 106/308 Q |
| 4,197,232 | 4/1980 | Bialous et al. | 524/164 |
| 4,198,493 | 4/1980 | Marciandi | 524/101 |
| 4,243,570 | 1/1981 | Mark et al. | 524/101 |

*Primary Examiner*—John Kight, III
*Assistant Examiner*—R. A. White

[57] ABSTRACT

A polycarbonate such as bisphenol-A homopolycarbonate containing a small amount of a barbituate, e.g., sodium 2-thiobarbituate, resists combustion upon exposure to a low temperature ignition source.

6 Claims, No Drawings

CARBONATE POLYMERS CONTAINING A BARBITUATE AS AN IGNITION DEPRESSANT

DESCRIPTION OF THE INVENTION

This invention relates to carbonate polymers containing additives which inhibit combustion upon exposure of the polycarbonates to low temperature ignition sources.

Polycarbonates derived from reactions of dihydroxy-organic compounds, particularly the dihydric phenols, and carbonic acid derivatives, such as phosgene, have found extensive commercial application because of their excellent physical properties. These thermoplastic polymers and other carbonate polymers appear to be particularly suitable for the manufacture of molded parts wherein impact strength, rigidity, toughness, heat resistance and excellent electrical properties are required.

Unfortunately, however, these polymers exhibit a brief but definite burning time when contacted with an open flame or comparable low temperature ignition source. More importantly, as is often the case, the polycarbonates contain stabilizers and other additives which are often more combustible than the unmodified polycarbonate. As a result, the modified polycarbonate frequently exhibits substantially poorer resistance to combustion than does the unmodified polycarbonate.

In attempts to increase the combustion resistance of polycarbonates including modified forms thereof, it has been a common practice to employ monomeric phosphites, phosphoric acid esters, thiophosphoric acid esters containing halogenated alkyl radicals and halogenated organic compounds into the polycarbonate. However, in order to obtain any noticeable improvement in combustion resistance, these additives have been employed in such large quantities that they often adversely affect many of the desirable physical and mechanical properties of the polycarbonate.

More recently, for example, as taught in U.S. Pat. No. 3,919,167, various organosulfonate salts have been employed as fire retardant additives for the polycarbonates. While these materials do not have a substantial deleterious effect on the physical properties of the polycarbonate, they generally must be employed in concentrations of at least one weight percent based on the polycarbonate in order to obtain a material that does not exhibit flaming drips upon a combustion in accordance with Underwriters Lab Standard Test UL-94.

In view of the deficiencies of conventional fire retardant polycarbonate compositions, it would be highly desirable to provide a polycarbonate composition having improved resistance to burning when exposed to a low temperature ignition source.

SUMMARY OF THE INVENTION

The present invention is a polycarbonate composition comprising a carbonate polymer having dispersed therein a thermally stable barbituate. The barbituate is present in an amount sufficient to retard combustion when the composition is exposed to a low temperature ignition source. Hereinafter, such composition shall be referred to as a fire retardant polycarbonate. The fire retardant polycarbonate of the present invention exhibits surprisingly high resistance to combustion and physical properties comparable to the carbonate polymer containing no barbituate.

The fire retardant polycarbonate of the present invention is suitably employed in most applications in which polycarbonates have been previously utilized. Applications of particular interest for the utilization of the fire retardant polycarbonates of this invention are as follows: automobile parts, e.g., air filters, fan housings, exterior components; housings for electrical motors, appliances, business and office equipment, photographic equipment, electrical switch boxes, electronic components, lighting and aircraft applications.

In general, such fire retardant polycarbonates are particularly useful in applications wherein the polycarbonate part is likely to be exposed to low temperature ignition sources.

DETAILED DESCRIPTION OF THE EMBODIMENTS

The carbonate polymers employed in the present invention are advantageously aromatic carbonate polymers such as the trityl diol carbonates described in U.S. Pat. Nos. 3,036,036; 3,036,037; 3,036,038 and 3,036,039; polycarbonates of bis(ar-hydroxyphenyl) alkylidenes (often called bisphenol-A type diols) including their aromatically and aliphatically substituted derivatives such as disclosed in U.S. Pat. Nos. 2,999,835; 3,038,365 and 3,334,154; and carbonate polymers derived from other aromatic diols such as described in U.S. Pat. No. 3,169,121.

It is understood, of course, that the carbonate polymer may be derived from two or more different dihydric phenols or a copolymer of a dihydric phenol with a glycol or with a hydroxy or acid terminated polyester or with a dibasic acid in the event that a carbonate copolymer or interpolymer rather than a homopolymer is desired. Also suitable for the practice of this invention are blends of any one of the above carbonate polymers. Also included in the term "carbonate polymer" are the ester/carbonate copolymers of the types described in U.S. Pat. Nos. 3,169,121; 4,105,633; 4,156,069 and 4,287,787. Of the aforementioned carbonate polymers, the polycarbonates of bisphenol-A and derivatives, including copolycarbonates of bisphenol-A, are preferred. Methods for preparing carbonate polymers for use in the practice of this invention are well known, for example, several suitable methods are disclosed in the aforementioned patents which are hereby incorporated by reference in their entirety.

While any of the thermally stable barbituates are suitably employed in the practice of this invention, preferred salts are those represented by the formula:

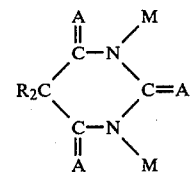

wherein each M is individually alkali metal, ammonium or hydrogen provided that at least one is alkali metal or ammonium; each R is individually hydrogen or hydrocarbyl such as alkyl, cycloalkyl or aryl; and each A is individually O, NR or S. By "heat stable" is meant that the barbituate can be combined with or compounded into the carbonate polymer in the desired quantities by melt mixing techniques in mixing apparatus such as a thermoplastic extruder wherein the carbonate polymer is converted to a heat plastified state during the dispersion of barbituate into the polymer. Such heat stable salts also can withstand the thermal conditions normally occurring during molding operations wherein the mixture of carbonate polymer and barbituate is melt processed using a conventional molding technique such as injection molding. Typically, the temperatures normally existing during the aforementioned mixing and molding techniques are those which are sufficient to convert the carbonate polymer to a heat plastified state but not enough to cause thermal degradation of the polymer, e.g., usually within the range of from 300° to about 325° C. More preferably, M is sodium or potassium; R is hydrogen or alkyl; and A is S or O or a combination of S and O. The most preferred barbituate is a thiobarbituate represented by the formula:

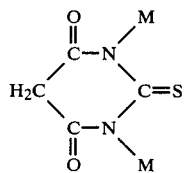

wherein at least one M is alkali metal, most preferably both of M are alkali metal. Examples of the preferred barbituates are sodium 2-thiobarbituate and disodium 2-thiobarbituate. The salts are employed in particulate or powder form wherein the average particle diameter is preferably less than 5 micrometers, most preferably less than 1 micrometer.

Methods for preparing the salts suitably employed in the practice of this invention are described in Kirk-Othmer, "Encyclopedia of Chemical Technology," Second Edition, Volume 3, Wiley & Sons, Inc., New York (1964).

The fire retardant polycarbonate of the present invention is suitably prepared by combining the carbonate polymer with an effective amount of salt using any one of a variety of blending procedures conventionally employed for incorporating additives into carbonate polymer resins. For example, dry particulates of the carbonate polymer and the barbituate may be dry blended and the resulting dry blend extruded into the desired shape. More preferably, an aqueous solution of the barbituate is sprayed onto a dry particulate of the carbonate polymer and then molded or extruded into the desired shape.

While any amount of barbituate that imparts to the polycarbonate an improved resistance to ignition and/or combustion is suitable, preferred amounts of the salt are in the range from about 0.001 to about 0.5, especially from about 0.01 to about 0.05, weight percent based on the weight of the polycarbonate.

In addition to the aforementioned salts, other additives may be included in the fire retardant polycarbonate of the present invention such as other fire retardant additives, fillers, pigments, dyes, antioxidants, stabilizers, ultraviolet light absorbers, mold release agents and other additives commonly employed in polycarbonate resin formulations.

The following examples are given to further illustrate the invention and should not be construed as limiting its scope. In the following examples, all parts and percentages are by weight unless otherwise indicated.

EXAMPLE 1

To a 2000-g sample of a homopolycarbonate of bisphenol-A, having a weight average molecular weight (Mw) of 32,000 as determined by gel permeation chromatography and sold under the trade name, Merlon M50F-1000 by Mobay Chemical, in the form of pellets [0.32 cm (dia)×0.32 cm (length)] is added 0.20 g of sodium 2-thiobarbituate:

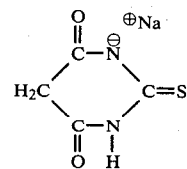

An aqueous solution of the salt is combined with the polycarbonate by spraying it onto the polycarbonate pellets which have been preheated to 250° F. The sprayed pellets are then dried at 250° F. for 4 hours. The resultant blend is extruded and repelletized in a single screw extruder equipped with a static mixer and operating at 525° F. The extruded pellets are redried at 250° F. for up to 4 hours. These redried pellets are molded into test bars (12.7 cm×1.27 cm×0.32 cm) using a screw type injection molding unit wherein the molding temperature is 575° F. The injection molded bars are tested for combustibility (oxygen index and fire retardance). The results of these tests (Sample No. 1) are reported in Table I.

For the purposes of comparison, two additional blends (Sample Nos. 2–3) are prepared using different amounts of the barbituate. These blends are also tested and the results are reported in Table I. In addition, five samples (Sample Nos. 4–8) are similarly prepared and tested using different amounts of disodium 2-thiobarbituate:

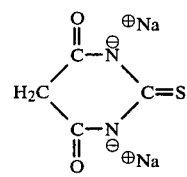

Also recorded in Table I are the combustibility properties of a control sample (Sample No. C) employing no fire retardant additive.

TABLE I

| Sample No. | Barbituate[1] Type | Barbituate[1] Amount % | O₂ Index[2] % O₂ | Flame Retardance Flame Time[3], Sec. | Rating[3] |
|---|---|---|---|---|---|
| 1 | NaTB | 0.01 | 34.6 | 7.3 | V-1, V-1 |
| 2 | NaTB | 0.050 | 36.0 | 6.7 | V-1, V-1 |
| 3 | NaTB | 0.20 | 30.8 | 12.5 | HB, HB |
| 4 | Na₂TB | 0.005 | 35.8 | 5.8 | V-1, V-1 |
| 5 | Na₂TB | 0.01 | 36.4 | 7.4 | V-1, V-1 |
| 6 | Na₂TB | 0.02 | 35.8 | 4.5 | V-0, V-0 |
| 7 | Na₂TB | 0.05 | 35.3 | 8.1 | V-1, V-2 |
| 8 | Na₂TB | 0.20 | 30.0 | 5.3 | V-2, V-2 |
| C* | None | — | 25.2 | 29.3 | HB, HB |

*Not an example of the invention.
[1]NaTB—sodium 2-thiobarbituate
Na₂TB—disodium 2-thiobarbituate
Amount—weight percent based on polycarbonate
[2]ASTM D-2863-70
[3]Underwriters Laboratories Standard Test UL-94 as described in Underwriters Laboratories, Inc. Publication - Standard for Safety 22-94, "Tests for Flammability of Plastic Materials for Parts in Devices and Appliances."

As evidenced by the data shown in Table I, the salts impart significant fire retardance to carbonate polymers particularly at low levels, e.g., 0.005–0.05 percent.

What is claimed is:

1. A composition comprising a carbonate polymer having dispersed therein a thermally stable barbituate in an amount sufficient to retard combustion when the composition is exposed to a low temperature ignition source.

2. The composition of claim 1 wherein the barbituate is represented by the formula:

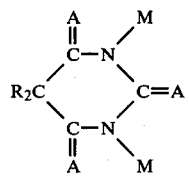

wherein each M is individually alkali metal, ammonium or hydrogen provided that at least one is alkali metal or ammonium; each R is individually hydrogen or hydrocarbyl such as alkyl, cycloalkyl or aryl; and each A is individually O, NR or S.

3. The composition of claim 2 wherein the barbituate is a thiobarbituate represented by the formula:

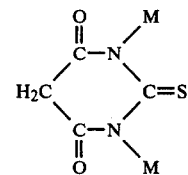

wherein both of M are alkali metal.

4. The composition of claim 2 wherein the barbituate is monosodium or disodium 2-thiobarbituate and is present in an amount from about 0.01 to about 0.05 weight percent of the carbonate polymer.

5. The composition of claim 1 wherein the carbonate polymer is a carbonate homopolymer of bisphenol-A.

6. The composition of claim 1 wherein the carbonate polymer is a copolyestercarbonate of bisphenol-A and terephthalic acid, isophthalic acid or a mixture thereof.

* * * * *